United States Patent
Zambare et al.

(10) Patent No.: US 11,002,526 B2
(45) Date of Patent: May 11, 2021

(54) POSITION DETERMINING SYSTEM

(71) Applicant: Indiana University Research and Technology Corporation, Indianaplis, IN (US)

(72) Inventors: Hrishikesh Balasaheb Zambare, Waterloo, IA (US); Ali Razban, Carmel, IN (US); Suhas Pandurang Deshmukh, Pune (IN); Mahesh Shivaji Shewale, Pune (IN); Sharad S. Mulik, Pune (IN)

(73) Assignee: Indiana University Research and Technology Corporation, Indianapolis, IN (US)

( * ) Notice: Subject to any disclaimer, the term of this patent is extended or adjusted under 35 U.S.C. 154(b) by 92 days.

(21) Appl. No.: 16/226,055

(22) Filed: Dec. 19, 2018

(65) Prior Publication Data

US 2019/0195612 A1  Jun. 27, 2019

Related U.S. Application Data

(60) Provisional application No. 62/609,325, filed on Dec. 21, 2017.

(51) Int. Cl.
  *G01B 7/008* (2006.01)
  *H02K 41/035* (2006.01)
  *G01D 21/00* (2006.01)

(52) U.S. Cl.
  CPC ............. *G01B 7/008* (2013.01); *G01D 21/00* (2013.01); *H02K 41/0354* (2013.01)

(58) Field of Classification Search
  CPC ...... G01B 7/008; G01D 21/00; H02K 41/0354
  USPC .......................................................... 33/503
  See application file for complete search history.

(56) References Cited

U.S. PATENT DOCUMENTS

| | | | |
|---|---|---|---|
| 6,434,840 B1* | 8/2002 | Jourtchenko | B23Q 1/5412 33/1 M |
| 2003/0204959 A1* | 11/2003 | Hall | B23Q 1/545 33/1 M |
| 2006/0191148 A1* | 8/2006 | Lippuner | G01C 1/02 33/290 |
| 2013/0119785 A1* | 5/2013 | Han | G02B 7/102 310/12.16 |

(Continued)

OTHER PUBLICATIONS

S. S. Mulik, S. P. Deshmukh, M. S. Shewale, H. B. Zambare and A. P. Sundare, "Design and implementation of position estimator algorithm on double flexural manipulator," 2017 International Conference on Nascent Technologies in Engineering (ICNTE), Navi Mumbai, 2017, pp. 1-5, doi: 10.1109/ICNTE.2017.7947904.

(Continued)

*Primary Examiner* — George B Bennett
(74) *Attorney, Agent, or Firm* — Faegre Drinker Biddle & Reath LLP

(57) ABSTRACT

An XYZ flexural mechanism comprising an X-axis flexural mechanism comprising a first voice coil actuator, a motion stage platform, a plurality of flexural bearings, and a plurality of guide rods, a Y-axis flexural mechanism comprising a second voice coil actuator, a plurality of flexural bearings, a plurality of guide rods, and a frame, and a Z-axis flexural mechanism comprising a third voice coil actuator, a plurality of flexural bearings, a plurality of guide rods, and a frame, the frame supporting the XYZ flexural mechanism.

20 Claims, 6 Drawing Sheets

(56) References Cited

U.S. PATENT DOCUMENTS

2015/0285608 A1* 10/2015 Singh .................. G01B 5/0014
                                                                33/503
2020/0249424 A1*  8/2020 Ho ..................... H02K 41/0354

OTHER PUBLICATIONS

Dejima, S., Gao, W., Katakura, K., Kiyono, S., & Tomita, Y. (2005). Dynamic modeling, controller design and experimental validation of a planar motion stage for precision positioning. Precision engineering, 29(3), 263-271.

Li, Y., & Xu, Q. (2009). Modeling and performance evaluation of a flexure-based XY parallel micromanipulator. Mechanism and machine Theory, 44(12), 2127-2152_.

Yao, Q., Dong, J., & Ferreira, P. M. (2007). Design, analysis, fabrication and testing of a parallel-kinematic micropositioning XY stage. International Journal of Machine Tools and Manufacture, 47(6), 946-961.

Kim, H. S. & Cho, Y. M. (2009). Design and modeling of a novel 3-DOF precision micro-stage. Mechatronics, 19(5), 598-608.

Glenn, B. C., & Bouton, C. E. (May 2005). Sensorless position control of a linear voice-coil transducer using sliding mode observers. In Smart Structures and Materials 2005: Modeling, Signal Processing, and Control (vol. 5757, pp. 246-257). International Society for Optics and Photonics.

Chen, K. S., Trumper, D. L, & Smith, S. T. (2002). Design and control for an electromagnetically driven X—Y—θ stage. Precision Engineering, 26(4), 355-369.

Liu, P, Yan, P., & Zhang, Z. (2015). Design and analysis of an X—Y parallel nanopositioner supporting large-stroke servomechanism. Proceedings of the Institution of Mechanical Engineers, Part C: Journal of Mechanical Engineering Science, 229(2), 364-376. OCLC sent Nov. 23, 2020 on TN:2036579. Received and downloaded on Nov. 24, 2020.

Xiao, S., & Li, Y. (2012). Optimal Design, Fabrication, and Control of an $ XY $ Micropositioning Stage Driven by Electromagnetic Actuators. IEEE Transactions on Industrial Electronics, 60(10), 4613-4626.

Yong, Y. K. Aphale, S. S., & Moheimani, S. R. (2008). Design, identification, and control of a flexure-based XY stage for fast nanoscale positioning. IEEE Transactions on Nanotechnology, 8(1), 46-54.

Messenger, R. K., Aten, Q. T., McLain, T. W., & Howell, L. L. (2009). Piezoresistive feedback control of a MEMS thermal actuator. Journal of Microelectromechanical systems, 18(6), 1267-1278.

Kim, M., Moon, W., Yoon, E., & Lee, K. R. (2006). A new capacitive displacement sensor with high accuracy and long-range. Sensors and Actuators A: Physical, 130, 135-141.

Fericean, S., & Droxler, R. (2007). New noncontacting inductive analog proximity and inductive linear displacement sensors for industrial automation. IEEE Sensors Journal, 7(11), 1538-1545.

Khiat, A., Lamarque, F., Prelle, C., Pouille, P., Leester-Schädel, M., & Büttgenbach, S. (2010). Two-dimension fiber optic sensor for high-resolution and long-range linear measurements. Sensors and Actuators A: Physical, 158(1), 43-50.

* cited by examiner

POSITION DETERMINING SYSTEM

RELATED APPLICATIONS

The present disclosure is related to and claims priority to U.S. Provisional Application No. 62/609,325, filed Dec. 21, 2017, entitled "POSITION DETERMINING SYSTEM," the entire disclosure of which is hereby expressly incorporated herein by reference.

FIELD OF DISCLOSURE

The present disclosure relates generally to a position determining system. In particular, the present disclosure relates to a high precision position determining system including a sensor-less XYZ flexural mechanism.

BACKGROUND OF DISCLOSURE

When it comes to scanning or determining a position of an object in the X, Y, and Z directions, many of the present instruments have a limitation for the precision that can be obtained by the process used for scanning purposes. In addition, other present instruments are relatively costly. Thus, it would be beneficial to have a positioning system capable of very precise scanning that is not overly expensive. The position determining system of the present disclosure includes a sensor-less XYZ flexural mechanism that is actuated by voice coil actuators and provides smooth and almost friction-less motion by which a high degree of accuracy can be obtained while transmitting the motion or scanning.

SUMMARY OF THE DISCLOSURE

In one embodiment of the present disclosure, an XYZ flexural mechanism is disclosed comprising an X-axis flexural mechanism comprising a first voice coil actuator, a motion stage platform, a plurality of flexural bearings, and a plurality of guide rods, a Y-axis flexural mechanism comprising a second voice coil actuator, a plurality of flexural bearings, a plurality of guide rods, and a frame, and a Z-axis flexural mechanism comprising a third voice coil actuator, a plurality of flexural bearings, a plurality of guide rods, and a frame, the frame supporting the XYZ flexural mechanism.

In one aspect of the mechanism, the frame of the Y-axis flexural mechanism encompasses the X-axis flexural mechanism, the plurality of flexural bearings of the Y-axis flexural mechanism and the plurality of guide rods of the Y-axis flexural mechanism.

In another aspect of the mechanism, the housing of the Z-axis flexural mechanism encompasses at least a portion of the Y-axis flexural mechanism, the plurality of flexural bearings of the Z-axis flexural mechanism and the plurality of guide rods of the Z-axis flexural mechanism.

In a further aspect of the mechanism, the mechanism further comprises a second Z-axis flexural mechanism opposite the first, where the second Z-axis flexural mechanism includes a fourth voice coil actuator, a plurality of flexural bearings, a plurality of guide rods, and a frame, the third voice coil actuator and the fourth voice coil actuator configured to be coupled in parallel.

In another aspect of the mechanism, first, second, and third voice coil actuators each comprise a magnet and a resonant spring.

In another embodiment of the present disclosure, a position determining system is provided and includes an XYZ flexural mechanism including: an X-axis flexural mechanism comprising a first voice coil actuator and a motion stage platform, a Y-axis flexural mechanism comprising a second voice coil actuator, a Z-axis flexural mechanism comprising a third voice coil actuator, and a frame, the frame supporting the XYZ flexural mechanism; and a mechatronic interface system including: a computer configured to provide amplitude and frequency values to a connection board coupled to the computer and to determine an estimated position of the motion stage platform based on corresponding current and voltage values of each of the first, second, and third voice coil actuators; and the connection board configured to provide a control signal based on the amplitude and frequency values provided by the computer, the control signal configured to control the XYZ flexural mechanism.

In one example, the connection board determines a respective position of each of the first, second, and third voice coil actuators using the control signal.

In another example, the position determining system further includes a linear current amplifier coupled to the connection board and configured to receive the control signal from the connection board. In a variation, the linear current amplifier is configured to convert and amplify the control signal from the connection board using a power supply, and to transmit the control signal to at least one of: the first, second, and third voice coil actuators.

In yet another example, the position determining system includes a voltage and current monitoring system configured to receive current and voltage values from at least one of: the X-axis flexural mechanism, Y-axis flexural mechanism, and Z-axis flexural mechanism of the XYZ flexural mechanism. In a variation, the connection board is configured to receive the current and voltage values from the voltage and current monitoring system and provide the current and voltage values to the computer. In another variation, the computer is configured to determine the estimated position of the motion stage platform based on the current voltage values received from the voltage and current monitoring system. In yet another variation, the voltage and current monitoring system is coupled to the XYZ flexural mechanism and the connection board, and configured to monitor force provided to at least one of: the first, second, and third voice coil actuators by measuring the current and voltage values of at least one of: the first, second, and third voice coil actuators. In still another variation, the voltage and current monitoring system is configured to monitor corresponding current and voltage values of at least one of: the first, second, and third voice coil actuators such that an estimated position of a respective voice coil actuator is determined based on the corresponding current and voltage values. In a further variation, the voltage and current monitoring system includes at least one analog-to-digital converter block which measures the current and voltage values and transmits the current and voltage values to the connection board and to the computer to calculate a current position of at least one of: the first, second, and third voice coil actuators.

In still another example, the position determining system includes an optical encoder coupled to the connection board and the XYZ flexural mechanism and configured to measure an actual position of the motion stage platform of the X-axis flexural mechanism. In a variation, the optical encoder is configured to compare the actual position of the motion stage platform to the estimated position of the motion stage platform. In another variation, a proportional integral derivative controller is used to generate another control signal based on an error between a reference signal provided by the optical encoder and the estimated position of the motion stage platform.

In yet another embodiment of the present disclosure, an XYZ flexural mechanism is provided and includes an X-axis flexural mechanism comprising a first voice coil actuator, a first flexural bearing, and a motion stage platform; a Y-axis flexural mechanism comprising a second voice coil actuator and a second flexural bearing; a Z-axis flexural mechanism comprising a third voice coil actuator and a third flexural bearing; a frame, the frame supporting the XYZ flexural mechanism. Each of the first, second, and third voice coil actuators includes a linear motor, a piston, a magnet, and a voice coil, and connected to a supporting structure such that the first, second, and third flexural bearings support the motion stage platform in an orthogonal direction and allow smooth frictionless motion in axial directions relative to the motion stage platform.

In one example, each of the first, second, and third voice coil actuators includes an output shaft configured to extend from a corresponding one of the first, second, and third voice coil actuators through a corresponding one of the first, second, and third flexural bearings to provide displacement of the motion stage platform using the output shaft.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this disclosure will become more readily appreciated as the same becomes better understood by reference to the following detailed description when taken in conjunction with the accompanying drawing.

Figure 1:
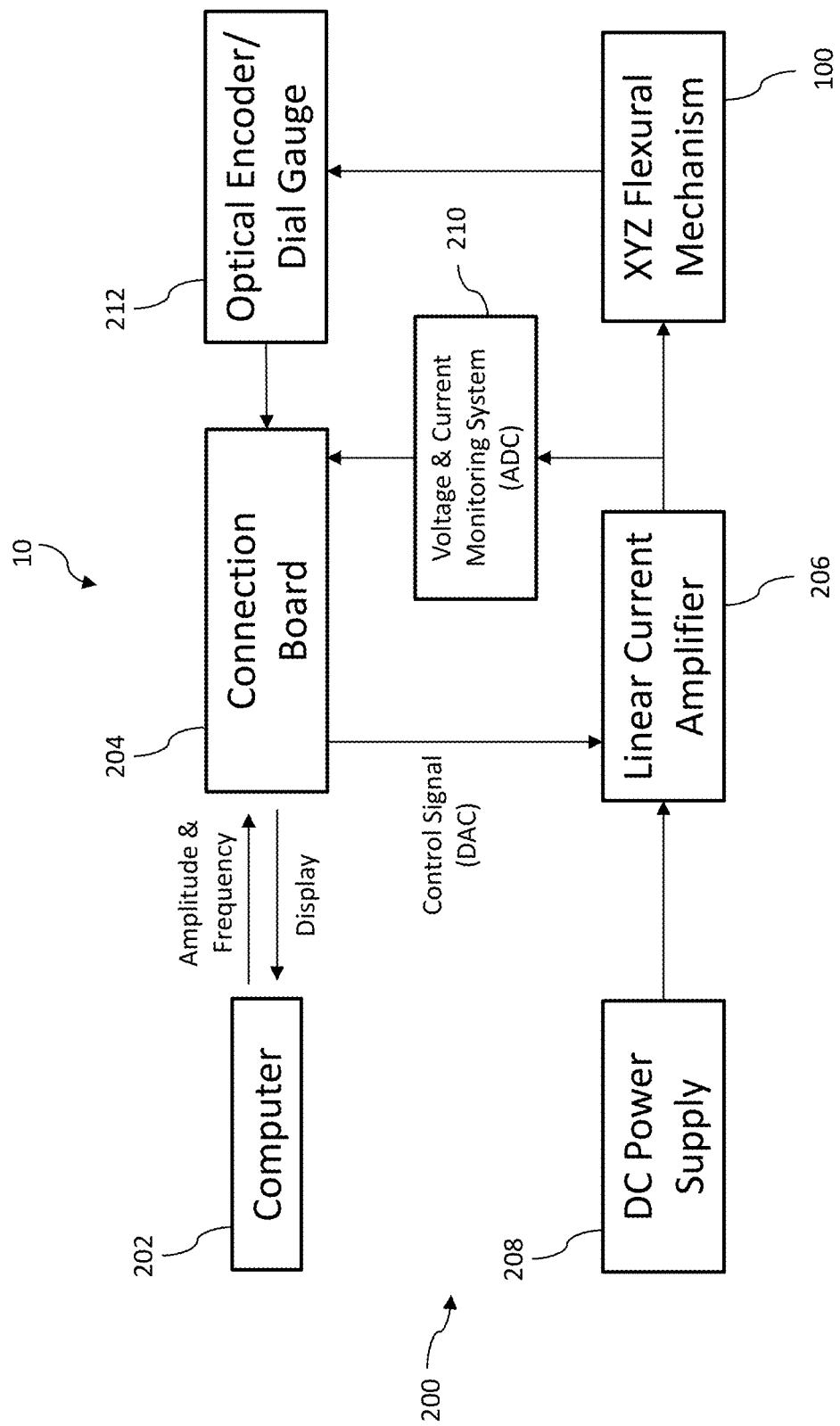
FIG. 1 shows a block diagram of a position determining system of the present disclosure including an XYZ flexural mechanism and a mechatronic interface system.

Although the drawing represents an embodiment of various features and components according to the present disclosure, the drawing is not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION

For the purposes of promoting an understanding of the principals of the disclosure, reference will now be made to the embodiment illustrated in the drawing, which is described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

A position determining system is disclosed for precision scanning applications using flexural bearings. Referring to FIG. 1, a position determining system 10 of the present disclosure, shown in diagram form, comprises an XYZ flexural mechanism 100 and a mechatronic interface system 200.

With reference to FIGS. 2-6, XYZ flexural mechanism 100 comprises three separate axial flexural mechanisms, an X-axis flexural mechanism 101, a Y-axis flexural mechanism 102, and a Z-axis flexural mechanism 103. In various embodiments, XYZ flexural mechanism 100 includes two Z-axis flexural mechanisms 103 due to the weight of mechanism 100. When XYZ flexural mechanism 100 includes two Z-axis flexural mechanisms 103, the Z-axis flexural mechanisms 103 are positioned on opposite sides of the X-axis and Y-axis flexural mechanisms 101 and 102, and voice coil actuators 103A of each Z-axis flexural mechanism are coupled in parallel to allow precise positioning to be determined. Thus, in an exemplary embodiment, XYZ flexural mechanism 100 may include four sets of flexural bearings (spiral configuration) 101B, 102F, and 103E used for smooth operation of mechanism 100, four voice coil actuators 101A, 102A, and 103A used to actuate motion stage platform 101G, where each voice coil actuator 101A, 102A, and 103A of XYZ flexural mechanism 100 generally comprises a linear motor 104, a piston 106, a magnet 108, and a voice coil 110 (FIG. 6), and supporting structure or frames 101F, 102C, and 103D such that flexural bearings 101B, 102F, and 103E support motion stage platform 101G in the orthogonal direction and allows smooth frictionless motion in the axial directions. Each voice coil actuator 101A, 102A, and 103A of flexural mechanism 100 has a constant factor which is used to determine the magnitude of force for the amount of current drawn by actuators 101A, 102A, and 103A. The operation of mechanism 100 is sensor-less since voice coil actuators 101A, 102A, and 103A act as both actuators and sensors. Voice actuators 101A, 102A, and 103A can act as sensors since they can provide the displacement of an output shaft, where the displacement of the output shaft for a particular amount of set parameters can be found out experimentally.

Figure 2:
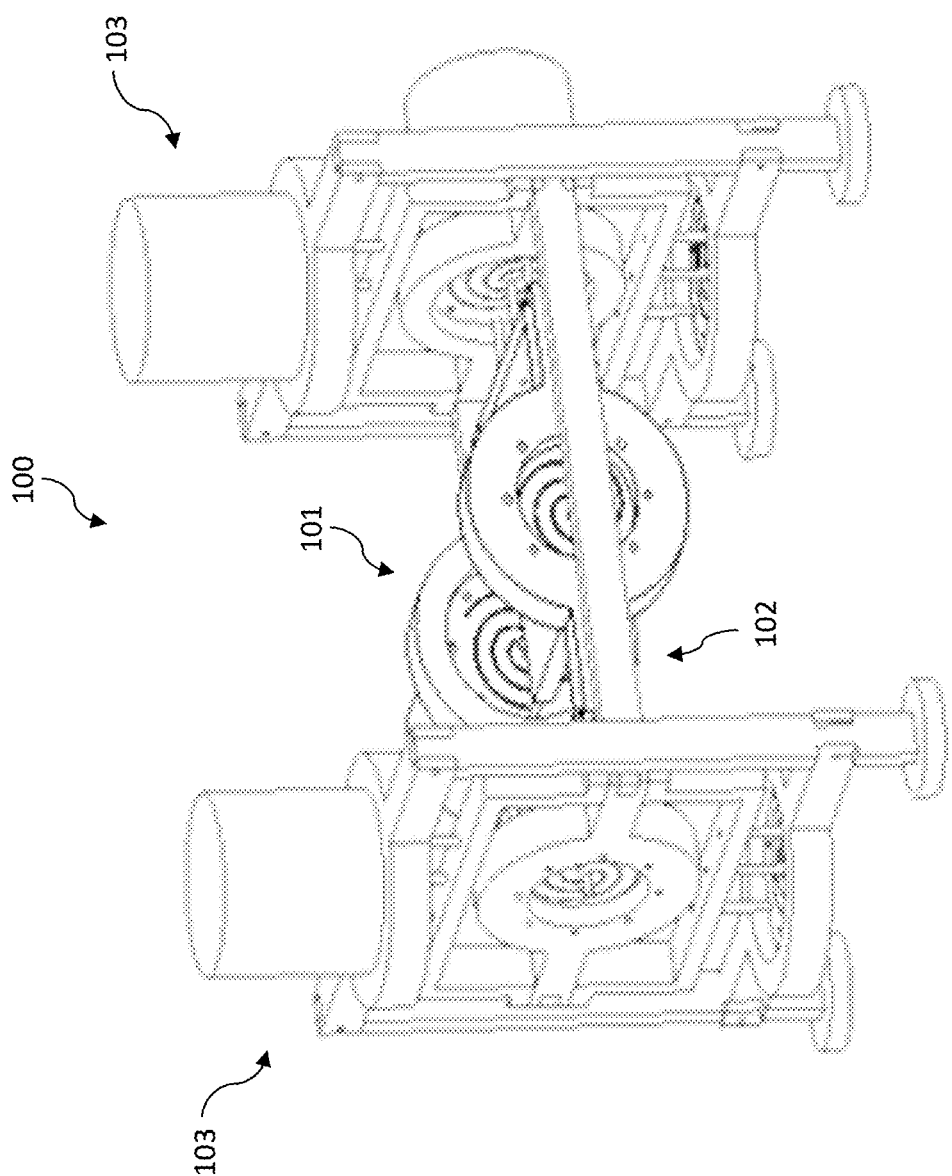
FIG. 2 shows a perspective view of the XYZ flexural mechanism of the position determining system of FIG. 1 comprising an X-axis flexural mechanism, a Y-axis flexural mechanism, and a Z-axis flexural mechanism.
Figure 3:
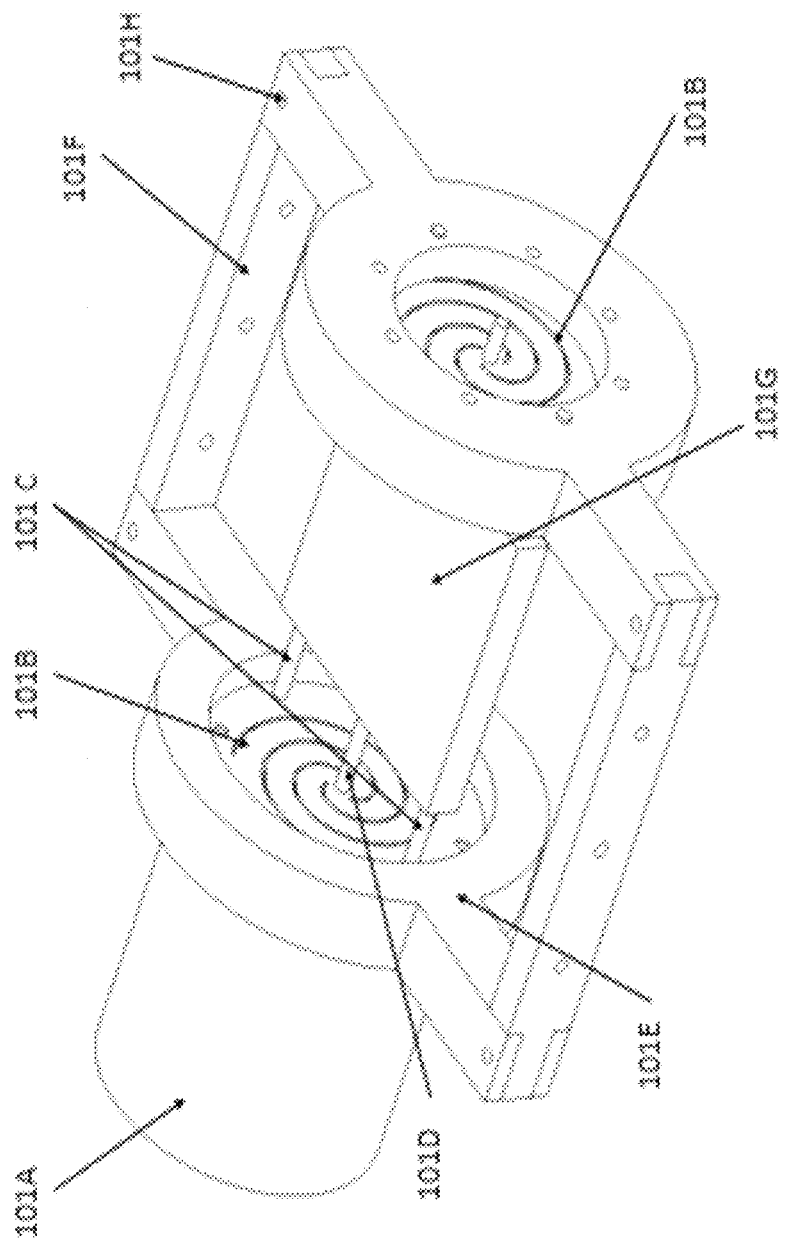
FIG. 3 shows a perspective view of the X-axis flexural mechanism of FIG. 2.
Figure 4:
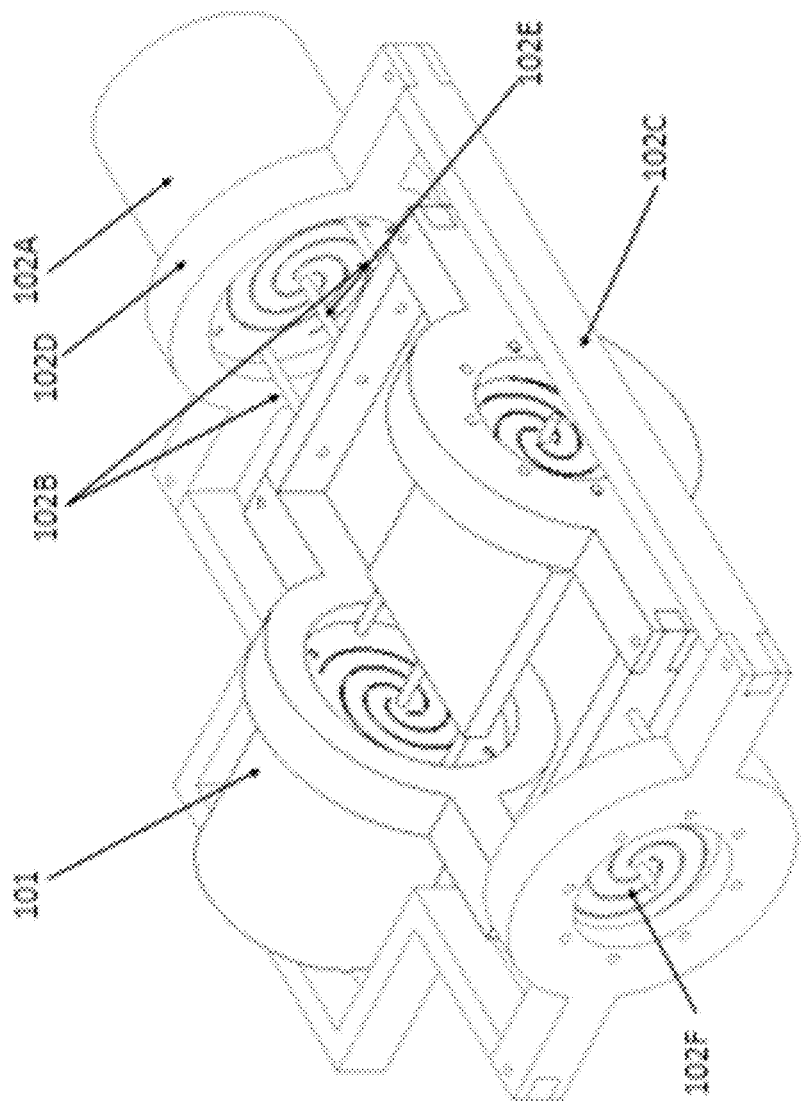
FIG. 4 shows a perspective view of the X-axis flexural mechanism and the Y-axis flexural mechanism of FIG. 2.

Referring to FIGS. 2-4, X-axis flexural mechanism 101 of XYZ flexural mechanism 100 generally includes voice coil actuator 101A, a set of two flexural bearings 101B, a pair of guide rods with antifriction coating 101C, an output shaft 101D, bearing housings 101E, a support structure or frame 101F, and a motion stage platform 101G. Motion stage platform 101G is positioned between flexural bearings 101B, which are each housed by one of bearing housings 101E, with guide rods 101C coupling bearing housings 101E and/or flexural bearings 101B to motion stage platform 101G. In various embodiments, each of guide rods 101C may extend through motion stage platform 101G, while in other embodiments, each of guide rods 101C may include two portions, where a first portion couples one of bearing housings 101E and/or one of flexural bearings 101B to a first side of motion stage platform 101G and a second portion couples the other bearing housing 101E and/or the other flexural bearing 101B to a second side, opposite the first side, of motion stage platform 101B. In addition, output shaft 101D extends from voice coil actuator 101A through flexural bearings 101B and motion stage platform 101G. In various embodiments, output shaft 101D may extend through motion stage platform 101G, while in other embodiments, output shaft 101D may include two portions, where a first portion is coupled between voice coil actuator 101A and one of flexural bearings 101B and motion stage platform 101G, and a second portion is coupled between the other flexural bearing 101B and motion stage platform 101G. Frame 101F couples bearing housings 101E such that frame 101F and bearing housings 101E support and/or house flexural bearings 101B, guide rods 101C, output shaft 101D, and motion stage platform 101G.

For scanning motion in the X direction, motion is provided by actuation of voice coil actuator 101A of X-axis flexural mechanism 101. The force generated by voice coil actuator 101A is directly proportional to the current supplied to voice coil actuator 101A from mechatronic interface system 200. The motion in the X direction provided by voice coil actuator 101A is guided by guide rods 101C, output shaft 101D, and bearing housings 101E, which house flexural bearings 101B. Motion stage platform 101G receives motion from voice coil actuator 101A via output shaft 101D of voice coil actuator 101A. When the linear motion of voice coil actuator 101A is transferred via shaft 101D to motion stage platform 101G, output shaft 101D on the opposite side of platform 101G receives the motion and deforms flexural bearing 101B.

With reference now to FIGS. 2 and 4, Y-axis flexural mechanism 102 generally includes voice coil actuator 102A, a pair of flexural bearings 102F, a pair of guide rods with antifriction coating 102B, an output shaft 102E, bearing housings 102D, and a supporting structure or frame 102C. X-axis flexural mechanism 101 is positioned between flexural bearings 102F, which are each housed by one of bearing housings 102, with guide rods 102B coupling bearing housings 102D and/or flexural bearings 102F to frame 101F of X-axis flexural mechanism 101. In various embodiments, each of guide rods 102B may include two portions, where a first portion couples one of bearing housings 102D and/or one of flexural bearings 102F to a first side of frame 101F and a second portion couples the other bearing housing 102D and/or the other flexural bearing 102F to a second side, opposite the first side, of frame 101F. In addition, output shaft 102E couples voice coil actuator 102A to flexural bearings 102F and frame 101F of X-axis flexural mechanism 101. In various embodiments, output shaft 102E includes two portions, where a first portion extends from voice coil actuator 102A through one of flexural bearings 102F and couples to frame 101F of X-axis flexural mechanism 101 and a second portion extends from frame 101F of X-axis flexural mechanism 101 through the other flexural bearing 102F. Frame 102C couples bearing housings 102D such that frame 102C and bearing housings 102D support and/or encompass X-axis flexural mechanism 101, guide rods 102B, output shaft 102E, flexural bearings 102F, and voice coil actuator 102A.

For scanning motion in the Y direction, motion is provided by actuation of voice coil actuator 102A. The motion in the Y direction is guided by guide rods 102B, output shaft 102E, bearing housings 102D, and frame 102C. Since the whole assembly of X-axis flexural mechanism 101, which was used for motion in X direction, is encompassed by frame 102C, motion is also given to X-axis flexural mechanism 101 and thus motion stage platform 101G in the Y direction by voice coil actuator 102A. The motion in the Y direction is transferred to motion stage platform 101G through frame 101F via shaft 102E which receives motion from voice coil actuator 102A. The motion in the Y direction deforms flexural bearing 102F opposite of voice coil actuator 102A.

Figure 5:
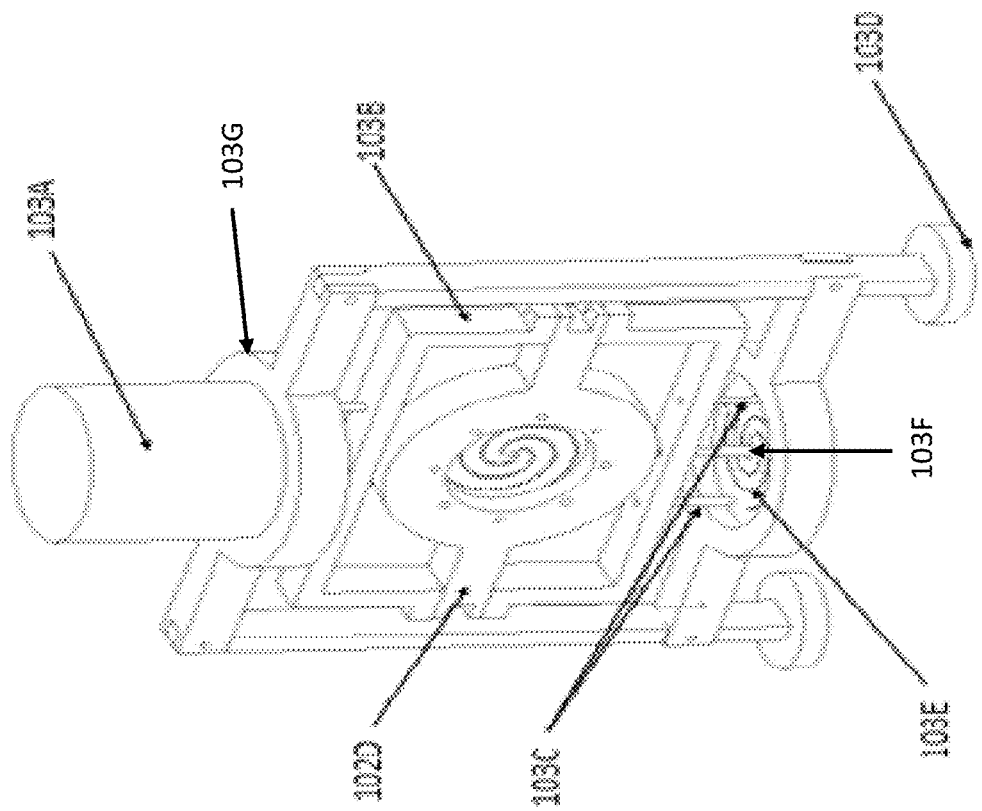
FIG. 5 shows a perspective view of the Z-axis flexural mechanism and a portion of the Y-axis flexural mechanism of FIG. 2.
Figure 6:
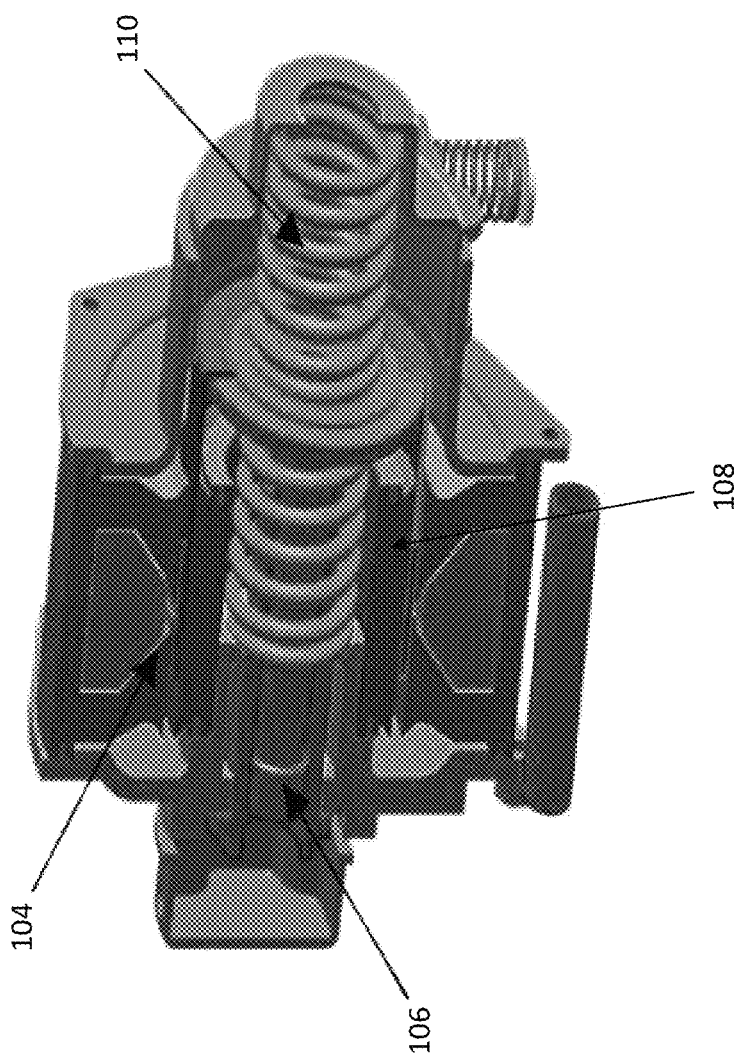
FIG. 6 shows a cross sectional view of a voice coil actuator of the XYZ flexural mechanism of FIG. 2.

Referring now to FIGS. 2 and 5, Z-axis flexural mechanism 103 generally includes voice coil actuator 103A, a set of flexural bearings 103E, bearing housings 103G, a pair of guide rods with antifriction coating 103C, an output shaft 103F, a motion frame 103B, and a supporting structure or frame 103D. Motion frame 103B is coupled to frame 102C and/or one of bearing housings 102D of Y-axis flexural mechanism 102 such that motion frame 103B encompasses one of bearing housings 102D of Y-axis flexural mechanism 102. Motion frame 103B and bearing housing 102 of Y-axis flexural mechanism 102 are positioned between flexural bearings 103E, which are each housed by one of bearing housings 103G, with guide rods 103C coupling bearing housings 101E and/or flexural bearings 101B to motion frame 103B. In various embodiments, each of guide rods 103C may include two portions, where a first portion couples one of bearing housings 103G and/or one of flexural bearings 103E to a first side of motion frame 103B and a second portion couples the other bearing housing 103G and/or the other flexural bearing 103E to a second side, opposite the first side, of motion frame 103B. In addition, output shaft 103F couples voice coil actuator 103A to flexural bearings 103E and motion frame 103B. In various embodiments, output shaft 103F includes two portions, where a first portion extends from voice coil actuator 103A through one of flexural bearings 103E and couples to motion frame 103B and a second portion extends from motion frame 103B through the other flexural bearing 103E. Supporting frame 103D supports the entire XYZ flexural mechanism on a surface, and encompasses and/or supports voice coil actuator 103A, flexural bearings 103E, guide rods 103C, output shaft 103F, and at least one bearing housing 102D of Y-axis flexural mechanism 102.

For scanning the motion in the Z direction, motion is provided by actuation of voice coil actuator 103A. The motion in the Z direction is guided by guide rods 103C, output shaft 103F, and bearing housings 103G. Since part of Y-axis flexural mechanism 102 is encompassed by motion frame 103B, motion in the Z direction is transferred to Y-axis flexural mechanism 102, X-axis flexural mechanism 101 and thus motion stage platform 101G by voice coil actuator 103A. The motion in the Z direction is transferred to motion stage platform 101G through motion frame 103B, bearing housings 102D, frame 102C, and frame 101F via shaft 103F which receives motion from voice coil actuator 103A. Motion frame 103B is coupled to both portions of output shaft 103F, and thus the motion applied to output shaft 103F deforms flexural bearing 103E opposite voice coil actuator 103A.

With reference now to FIG. 1, mechatronic interface system 200 of position determining system 10 generally includes a computer 202, a connection board 204, a linear current amplifier 206, a DC power supply 208, and a voltage and current monitoring system 210. In general, mechatronic interface system 200 is used to measure currents drawn by and voltages across voice coil actuators 101A, 102A, and/or 103A at different input signals, and estimate a precise position of motion stage platform 101G based on the currents and voltages across each of voice coil actuators 101A, 102A, and/or 103A using position estimator algorithm $$x = \frac{1}{\alpha} \int (V_a - R_a I_a) dt - L_a I_a,$$

where a is the motor constant including the magnetic flux times the length of the coil, $V_a$ is the supply voltage measured by voltage and current monitoring system 210, $R_a$ is the resistance of the coil, which is a constant value specific to each coil, $I_a$ is the current drawn by the coil measured by voltage and current monitoring system 210, dt is the finite time interval of integration, and $L_a$ is the inductance of the coil, which is a constant value specific to each coil.

Computer 202 of mechatronic interface system 200 is coupled to connection board 204. In general, computer 202 is configured to provide amplitude and frequency values to connection board 204 and determine and display the estimated position of motion stage platform 101G. In various embodiments, computer 202 includes a display and a microcontroller. The microcontroller of computer 202 may be programmed with a graphical user interface software (i.e., dSPACE ControlDesk) and a multi-paradigm numerical computing environment (i.e., a MATLAB interface). In various embodiments, the microcontroller of computer 202 may be a dSPACE DS1104 microcontroller configured to upgrade computer 202 to a development system for rapid control prototyping.

In addition, in various embodiments, computer 202 may further include a block diagram environment for multidomain simulation and Model-Based Design (i.e., Simulink). The block diagram environment is generally configured to support system-level design, simulation, automatic code generation, and continuous test and verification of embedded systems, and provide a graphical editor, customizable block libraries, and solvers for modeling and simulating dynamic systems. In various embodiments, the block diagram environment may be integrated with the multi-paradigm numerical computing environment to enable a user to incorporate the multi-paradigm numerical computing environment algorithms into models and export simulation results to the multi-paradigm numerical computing environment for further analysis.

Furthermore, in various embodiments, real time interface (RTI) blocks may be used for system integration, where a RTI library is embedded in the integrated block diagram and multi-paradigm numerical computing environments which allows computer 202 to access input/output ports of connection board 204. In various embodiments, the block diagram environment for multidomain simulation and Model-Based Design is further built such that system description files (.SDFs) may be uploaded onto the microcontroller of computer 202. The .SDF files may have a connection with the graphical user interface software which allows the user to create a layout of a control panel and provides easy measurement and data acquisition.

Connection board 204 of mechatronic interface system 200 is coupled to computer 202, linear current amplifier 206, and voltage and current monitoring system 210. In general, connection board 204 is configured to provide a control signal to linear current amplifier 206 based on amplitude and frequency values provided by computer 202, receive measured current and voltage values from X-axis flexural mechanism 101, Y-axis flexural mechanism 102, and Z-axis flexural mechanism 103 of XYZ flexural mechanism 100 through voltage and current monitoring system 210, and provide the measured current and voltage values to computer 202 such that the measured current and voltage values may be processed and the estimated position may be determined and displayed by the display of computer 202. In various embodiments, connection board 204 may be a dSPACE CLP1104 combined connector/LED panel.

Linear current amplifier 206 of mechatronic interface system 200 is coupled to connection board 204, DC power supply 208, and XYZ flexural mechanism 100. In general, linear current amplifier 206 is configured to perform as a driver circuit for voice coil actuators 101A, 102A, and/or 103A. More specifically, linear current amplifier 206, which has a gain of 2 A/V, is configured to convert and amplify the voltage or control signal output from connection board 204 to the appropriate current using DC power supply 208, and supply said current to actuators 101A, 102A, and/or 103A of flexural mechanism 101.

Voltage and current monitoring system 210 of mechatronic interface system 200 is coupled to XYZ flexural mechanism 100 and connection board 204. In general, voltage and current monitoring system 210 is configured to monitor force provided to voice coil actuators 101A, 102A, and/or 103A, and measure current and voltage signals from voice coil actuators 101A, 102A, and/or 103A. More specifically, as current passes through voice coils 110 of actuators 101A, 102A, and 103A, mechanical force is generated where the direction of force depends on the direction of the current. As such, the position of voice coil 110 of actuators 101A, 102A, and 103A is itself the position of motion stage platform 101G of flexural mechanism 100 in the respective directions. Thus, voltage and current monitoring system 210 monitors the currents drawn by and voltages across voice coils 110 of actuators 101A, 102A, and 103A such that the estimation of the position of voice coils 110 with respect to the position of magnet 108 in each actuator can be determined. In addition, voltage and current monitoring system 210 is generally configured to provide the current and voltage signals to connection board 204. Voltage and current monitoring system 210 may include two analog-to-digital converter (ADC) blocks which convert and/or measure the current and voltage signals and then fed the modified signals to connection board 204 and finally to a position estimator algorithm block in computer 202, which calculates the current position of voice coil actuators 101A, 102A, and/or 103A using the position estimator algorithm described above. In various embodiments, voltage and current monitoring system 210 may be integrated with XYZ flexural mechanism 100 and/or connection board 204.

Furthermore, in various embodiments, interface system 200 may further include an optical encoder or a dial gauge 212. Optical encoder/dial gauge 212 is generally coupled to connection board 204 and XYZ flexural mechanism 100 and configured to measure an actual position of motion stage platform 101G of XYZ flexural mechanism 100 and compare the actual position to an estimated positioned determined by interface system 200. However, optical encoder/dial gauge 212 is used for validation purposes only. Thus, a proportional integral derivative controller may be used to generate a control signal based on an error between a reference signal provided by optical encoder 212 and actual signal estimated by the position estimator block of interface system 200.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An XYZ flexural mechanism comprising:
   an X-axis flexural mechanism comprising a first voice coil actuator, a motion stage platform, a plurality of flexural bearings, and a plurality of guide rods;
   a Y-axis flexural mechanism comprising a second voice coil actuator, a plurality of flexural bearings, a plurality of guide rods, and a frame; and
   a Z-axis flexural mechanism comprising a third voice coil actuator, a plurality of flexural bearings, a plurality of guide rods, and a frame, the frame supporting the XYZ flexural mechanism.

2. The XYZ flexural mechanism of claim 1, wherein the frame of the Y-axis flexural mechanism encompasses the X-axis flexural mechanism, the plurality of flexural bearings of the Y-axis flexural mechanism and the plurality of guide rods of the Y-axis flexural mechanism.

3. The XYZ flexural mechanism of claim 1, wherein the housing of the Z-axis flexural mechanism encompasses at least a portion of the Y-axis flexural mechanism, the plurality of flexural bearings of the Z-axis flexural mechanism and the plurality of guide rods of the Z-axis flexural mechanism.

4. The XYZ flexural mechanism of claim 1 further comprising a second Z-axis flexural mechanism opposite the first, wherein the second Z-axis flexural mechanism includes a fourth voice coil actuator, a plurality of flexural bearings, a plurality of guide rods, and a frame, the third voice coil actuator and the fourth voice coil actuator configured to be coupled in parallel.

5. The XYZ flexural mechanism of claim 1, wherein first, second, and third voice coil actuators each comprise a magnet and a resonant spring.

6. A position determining system comprising:
   an XYZ flexural mechanism comprising:
      an X-axis flexural mechanism comprising a first voice coil actuator and a motion stage platform,
      a Y-axis flexural mechanism comprising a second voice coil actuator,
      a Z-axis flexural mechanism comprising a third voice coil actuator, and
      a frame, the frame supporting the XYZ flexural mechanism; and
   a mechatronic interface system comprising:
      a computer configured to provide amplitude and frequency values to a connection board coupled to the computer and to determine an estimated position of the motion stage platform based on corresponding current and voltage values of each of the first, second, and third voice coil actuators; and
      the connection board configured to provide a control signal based on the amplitude and frequency values provided by the computer, the control signal configured to control the XYZ flexural mechanism.

7. The position determining system of claim 6, wherein the connection board determines a respective position of each of the first, second, and third voice coil actuators using the control signal.

8. The position determining system of claim 6, further comprising a linear current amplifier coupled to the connection board and configured to receive the control signal from the connection board.

9. The position determining system of claim 8, wherein the linear current amplifier is configured to convert and amplify the control signal from the connection board using a power supply, and to transmit the control signal to at least one of: the first, second, and third voice coil actuators.

10. The position determining system of claim 6, further comprising a voltage and current monitoring system configured to receive current and voltage values from at least one of: the X-axis flexural mechanism, Y-axis flexural mechanism, and Z-axis flexural mechanism of the XYZ flexural mechanism.

11. The position determining system of claim 10, wherein the connection board is configured to receive the current and voltage values from the voltage and current monitoring system and provide the current and voltage values to the computer.

12. The position determining system of claim 11, wherein the computer is configured to determine the estimated position of the motion stage platform based on the current voltage values received from the voltage and current monitoring system.

13. The position determining system of claim 10, wherein the voltage and current monitoring system is coupled to the XYZ flexural mechanism and the connection board, and configured to monitor force provided to at least one of: the first, second, and third voice coil actuators by measuring the current and voltage values of at least one of: the first, second, and third voice coil actuators.

14. The position determining system of claim 13, wherein the voltage and current monitoring system is configured to monitor corresponding current and voltage values of at least one of: the first, second, and third voice coil actuators such that an estimated position of a respective voice coil actuator is determined based on the corresponding current and voltage values.

15. The position determining system of claim 10, wherein the voltage and current monitoring system includes at least one analog-to-digital converter block which measures the current and voltage values and transmits the current and voltage values to the connection board and to the computer to calculate a current position of at least one of: the first, second, and third voice coil actuators.

16. The position determining system of claim 6, further comprising an optical encoder coupled to the connection board and the XYZ flexural mechanism and configured to measure an actual position of the motion stage platform of the X-axis flexural mechanism.

17. The position determining system of claim 16, wherein the optical encoder is configured to compare the actual position of the motion stage platform to the estimated position of the motion stage platform.

18. The position determining system of claim 17, wherein a proportional integral derivative controller is used to generate another control signal based on an error between a reference signal provided by the optical encoder and the estimated position of the motion stage platform.

19. An XYZ flexural mechanism comprising:
an X-axis flexural mechanism comprising a first voice coil actuator, a first flexural bearing, and a motion stage platform;
a Y-axis flexural mechanism comprising a second voice coil actuator and a second flexural bearing;
a Z-axis flexural mechanism comprising a third voice coil actuator and a third flexural bearing;
a frame, the frame supporting the XYZ flexural mechanism;
each of the first, second, and third voice coil actuators comprising a linear motor, a piston, a magnet, and a voice coil, and connected to a supporting structure such that the first, second, and third flexural bearings support the motion stage platform in an orthogonal direction and allow smooth frictionless motion in axial directions relative to the motion stage platform.

20. The XYZ flexural mechanism of claim 19, wherein each of the first, second, and third voice coil actuators comprises an output shaft configured to extend from a corresponding one of the first, second, and third voice coil actuators through a corresponding one of the first, second, and third flexural bearings to provide displacement of the motion stage platform using the output shaft.

* * * * *